(No Model.) 2 Sheets—Sheet 1.
M. BRUNER.
PULVERIZING HARROW.
No. 396,644. Patented Jan. 22, 1889.
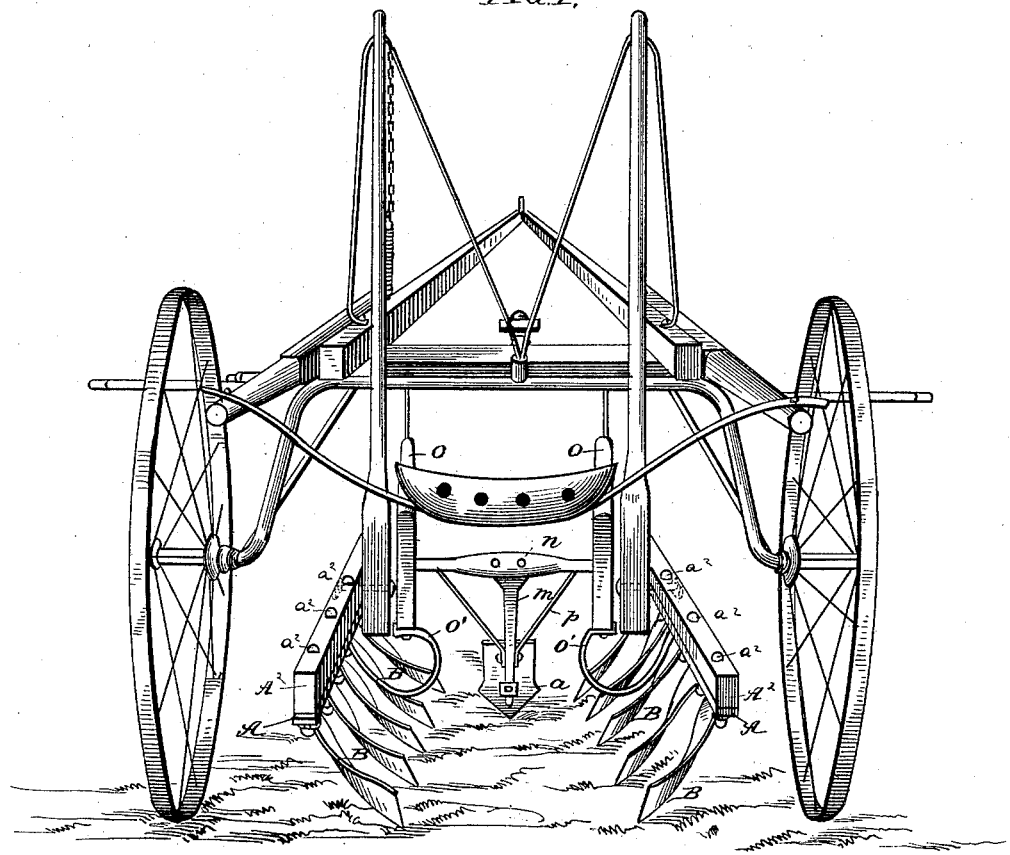

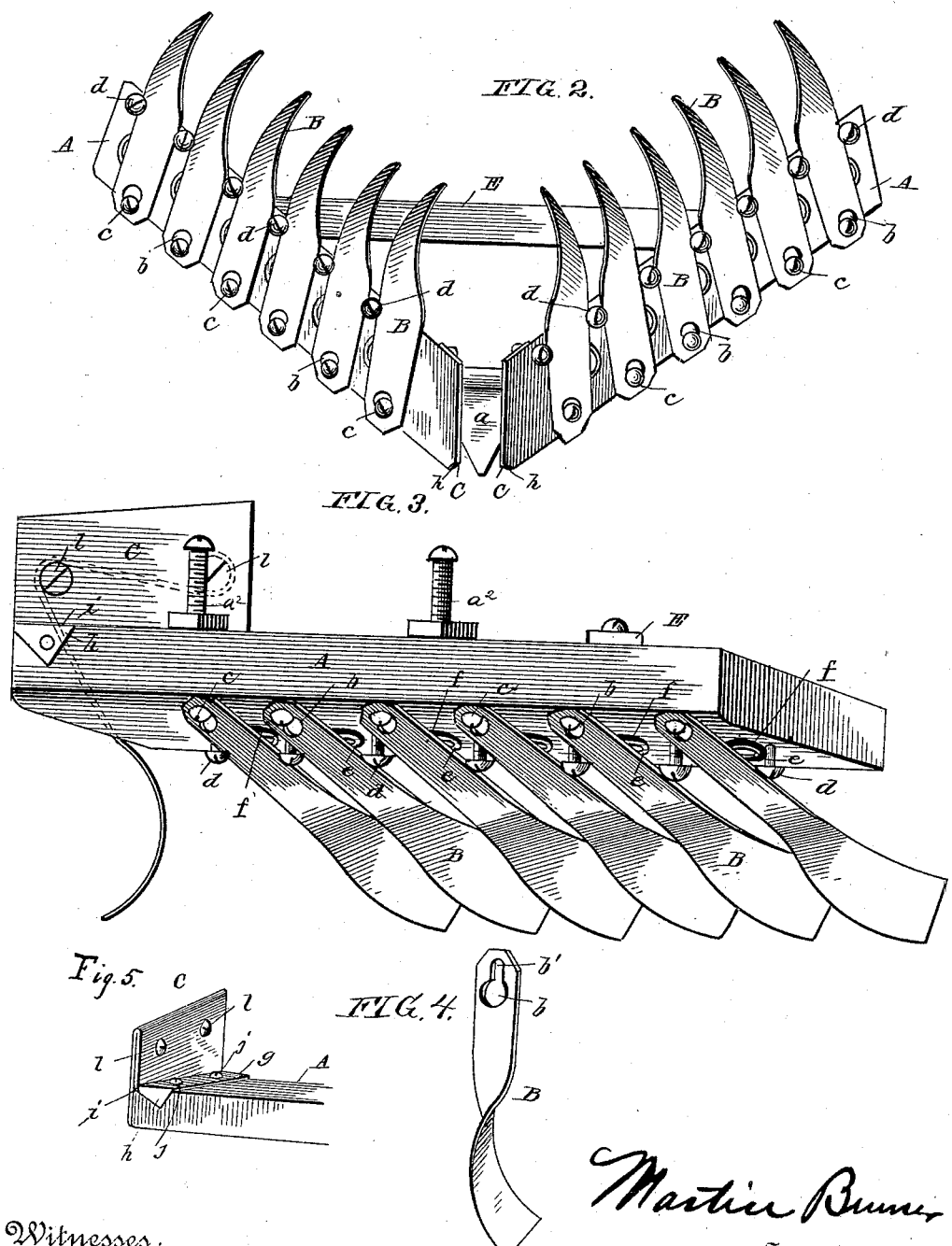

UNITED STATES PATENT OFFICE.

MARTIN BRUNER, OF BUCKLAND, OHIO.

PULVERIZING-HARROW.

SPECIFICATION forming part of Letters Patent No. 396,644, dated January 22, 1889.

Application filed March 15, 1887. Serial No. 231,055. (No model.)

*To all whom it may concern:*

Be it known that I, MARTIN BRUNER, a citizen of the United States, residing at Buckland, in the county of Auglaize and State of Ohio, have invented certain new and useful Improvements in Pulverizing-Harrows; and I do hereby declare the following to be a full, clear, and exact description of the invention, such as will enable others skilled in the art to which it appertains to make and use the same.

Figure 1 is a perspective of my improved harrow as it is shown mounted upon the running-gear of a wheel-harrow. Fig. 2 is a bottom plan view of my harrow. Fig. 3 is a side elevation of one-half of my harrow. Fig. 4 is a detail view of one of the teeth. Fig. 5 is a detail view of the end piece of each section.

In the accompanying drawings, A A designate the beams of my harrow, which are arranged diagonally beneath the axle of the harrow in such a manner as to form a triangular-shaped harrow the point of which comes in front.

Between the two beams A A is journaled loosely a spring tooth or shovel, $a$, which is adapted to be used with the harrow, and which, by reason of its elasticity, is adapted to run over stones or other rigid projections without lifting the harrow from its bearings, and it is also adapted to plow up the dirt in the middle of the strip, which is pulverized by the harrow as it passes over the ground.

The shovel $a$ may be of the usual construction and supported by a vertical post, $m$, which is rigidly secured to a horizontal post, $n$, in any suitable manner, the extremities of which posts are journaled in uprights O, projecting downwardly from the frame of the harrow, and the shovel is braced and strengthened by the diagonal braces $p$ $p$, all of which is clearly shown in Fig. 1; or I may use the spring-tooth shovel shown in Figs. 2 and 3, and to be hereinafter described, and, in fact, I prefer to use this form of shovel as being the best adapted for its purpose, owing to its elasticity.

Each of the teeth B is provided with a circular opening, $b$, which also has a slot, $b'$, at one side, which extends out toward the upper end of the tooth.

Each of the diagonal beams A A is provided with a bolt $c$, which is secured to the under side of the beam, and which is provided with a head which extends slightly beyond the plane of the lower face of the beam in such a manner as to permit of the adjustment of the teeth over the head of the bolt in a manner which will be hereinafter fully explained.

At the opposite side of the lower face of the beams A A, I provide a series of bolts, $d$ $d$, which are arranged in a zigzag position with relation to the bolts $c$ $c$ on the outer edge of the lower face of the diagonal beams A A. These bolts $d$ $d$ are arranged in pairs and in such a manner that each of the teeth B B is supported at its opposite edges by two of the bolts $d$ $d$ when in an operative position, as is clearly shown in Fig. 2. Between each of the rows of bolts $c$ and $d$, I provide recesses $f$, which are adapted to receive coiled springs $e$. These springs are inserted in the recesses $f$, and when the teeth B are in place on the diagonal beams A A the springs hold the teeth snugly up against the heads of the inner row of bolts $d$, and when the teeth in their operation strike upon a stone or other hard substance, as the harrow is being operated in the field, the springs will give sufficiently to partially deaden the force of the blow and to give sufficient time to have the force of the same distributed throughout the beam of the cultivator; or in most instances, where the obstruction is not very large, the tooth will readily slip by and over it without disturbing the beam at all. The object of this is threefold: In the first place, it saves the teeth; in the second place, it saves the driver from being jolted and tossed about, and, in the third place, it prevents the racking and wrenching of the harrow and its running-gear.

Each of the teeth is formed of steel, and is bent in such a manner as to present a cutting-edge at its outer free end, which is practically at right angles to the plane of the side of the under face of the tooth, while that portion of the tooth which is between the lower outer end of the tooth and the row of bolts $d$ $d$ extends at an angle of about forty-five degrees to the line of the face of the lower side of the upper end of the tooth. This forms an admirable cutting-edge, while the lower free curved end of the tooth serves as a mold-board to turn the dirt over after it has been harrowed up. The teeth, by reason of their shape, are also self-sharpening on the outer upper edge as the machine is operated, and when they become dull by constant use on their front face, or that face which is presented to the ground in the forward movement of the harrow, the teeth are taken out and reversed, presenting the opposite edge to the front, which serves to readily sharpen the front edge, which is not turned to the rear.

It will be observed that the process of removing and reversing the teeth is a very simple operation, as it can all be done without in any way disturbing the bolts, the elasticity of the spring, together with the friction of the bolt-heads $c$, serving to hold the teeth in position when once forced into place on the harrow.

Each of the diagonal beams A A is provided with two vertical plates, C C, having lips $g\ g$, which extend to the rear of the plates, which are bent at an angle of about forty-five degrees to the vertical line of the plate when it is in its normal position. At the outer side of the lips $g\ g$ there is also a lip, $h$, which extends at right angles to the line of the lips $g\ g$ and whose front end is bent, as will be seen by reference to Fig. 5. The vertical plate C is formed of a single sheet on its inside, which is bent up and then laps down over upon itself to form the outer flanges, which have been hereinbefore described.

From this description it will be observed that the diagonal beam A is firmly held in place within the plate by the lips on the plate C, which lips serve to hold it firmly against displacement in any direction, together with the bolt $j\ j$, which extends through the lower inner portion of the plate and into the ends of the diagonal beams A.

The beams A A are adapted to be secured to and removed from the under side of the beams $A^2\ A^2$ by the use of the bolts $a^2\ a^2$, as will be clearly understood by reference to the drawings. By this construction any desired form of plow or tooth may be secured to the under side of the beams $A^2\ A^2$.

The upper portions of the plates C C are provided with perforations $k\ k$ to receive the bolts $l\ l$, which are adapted to receive and accommodate the spring tooth or shovel $a$. These bolts $l\ l$ serve the double purpose of holding the shovel $a$ in place and of holding the front ends of the beams A A in position under the running-gear of the harrow. The beams A A are provided with a brace, E, which extends across the rear portion of the harrow and holds the two diagonal beams firmly in place.

This harrow is also adapted to be used as a cultivator. When it is desired to use it as a cultivator, the cross-bar E is removed, and the two front bolts, $l\ l$, and the central tooth or shovel, $a$, are also removed, thus leaving the diagonal beams A A free to float with the vertical standards of the running-gear of the cultivator, and leaving them free to be raised and lowered independently.

The uprights O O are provided with stirrups O' O', as shown in Fig. 1, adapted to receive the feet of the driver and enable him to regulate the depth at which the plows work into the ground when the device is being used as a cultivator.

If the rows are so close together that the outside teeth interfere with the adjoining rows, it is simply necessary to remove a sufficient number of the outside teeth to clear the outside row. When the teeth are reversed to sharpen them, they dig deeply into the ground, but do not displace very much of the earth which they have stirred up; but when they are in their normal position the outer free ends serve as a sort of mold-board and turn and pulverize the ground most successfully.

Having now described my invention, what I wish to secure by Letters Patent, and what I therefore claim, is—

1. In a harrow, the main beams having the double rows of bolts arranged thereon, and the harrow-teeth provided with perforations and slots engaging one of the rows of bolts, the other row of bolts connecting the edges of said teeth, and the cushioning-springs, in combination with the harrow-teeth, as shown and described, and for the purposes set forth.

2. In a harrow, the main beams having the double rows of bolts arranged thereon, and the harrow-teeth provided with perforations and slots engaging one of the rows of bolts, the other row of bolts connecting the edges of said teeth and their heads holding the teeth against displacement, in combination with the harrow-teeth, as shown and described, and for the purposes set forth.

3. In a harrow, the combination, with the main beams having a double row of bolts for connecting the teeth to the beams, and coiled springs interposed between the teeth and beams, of the pivoted spring-tooth interposed between the front of the beams, as shown and described, and for the purposes set forth.

In testimony that I claim the above as my invention I have hereunto set my hand in the presence of two subscribing witnesses.

MARTIN BRUNER.

Witnesses:
W. H. BUTCHER,
W. G. BROREIN.